March 31, 1964 D. T. AYERS, JR 3,126,794
FLUID PRESSURE MOTOR MECHANISM
Filed Jan. 3, 1963 2 Sheets-Sheet 1
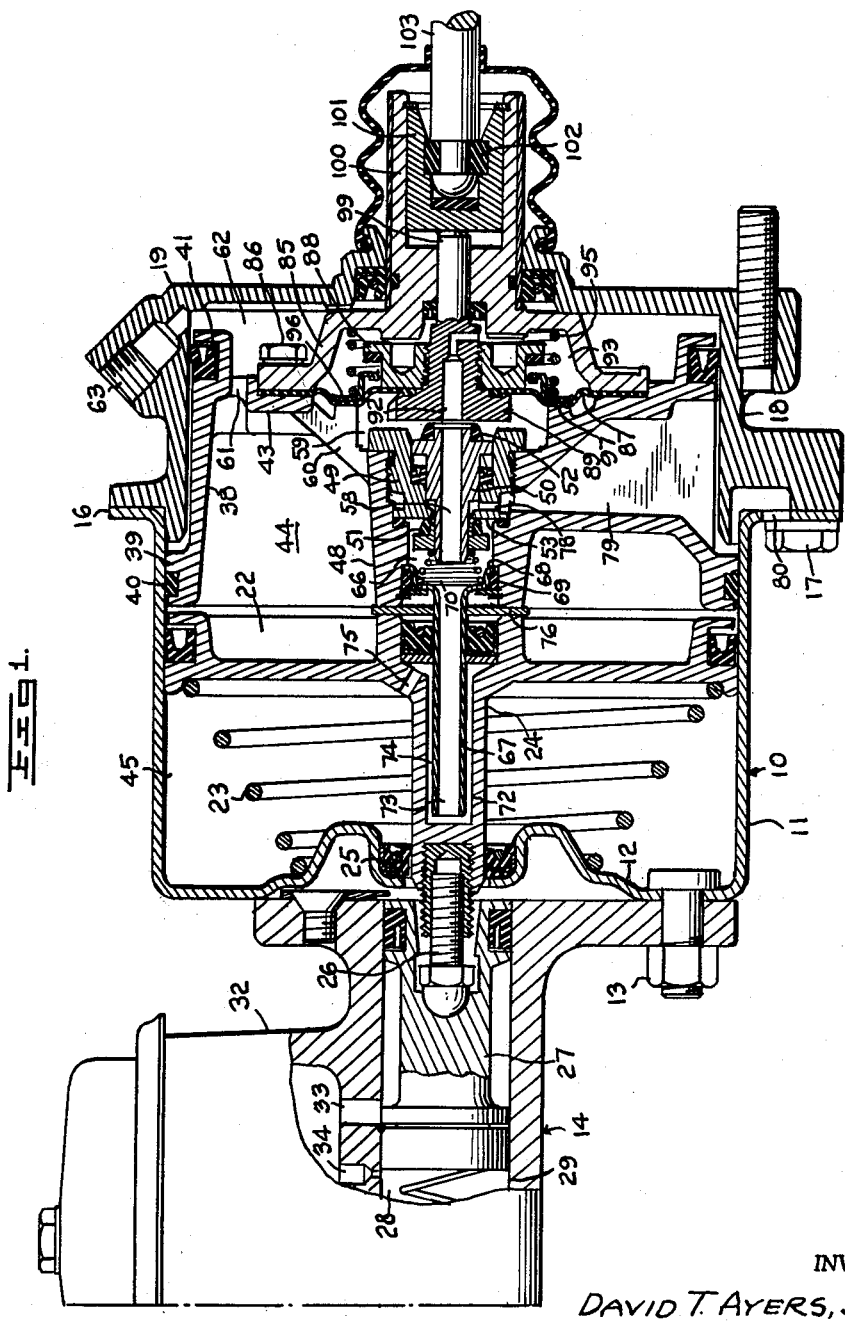
INVENTOR
DAVID T. AYERS, JR.
BY John F. Phillips
ATTORNEY March 31, 1964 D. T. AYERS, JR 3,126,794
FLUID PRESSURE MOTOR MECHANISM
Filed Jan. 3, 1963 2 Sheets-Sheet 2
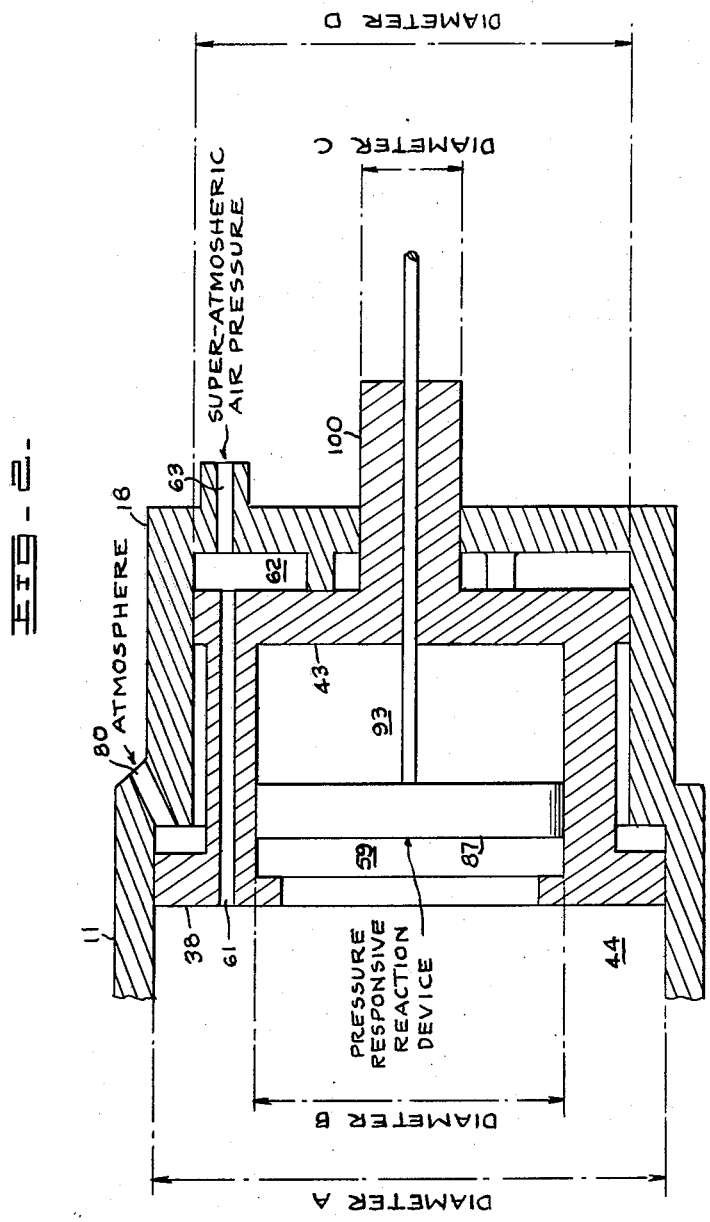
INVENTOR.
DAVID T. AYERS, JR.
BY John V. Phillips
ATTORNEY

United States Patent Office 3,126,794
Patented Mar. 31, 1964

3,126,794
FLUID PRESSURE MOTOR MECHANISM
David T. Ayers, Jr., Birmingham, Mich., assignor to Kelsey-Hayes Company, Romulus, Mich., a corporation of Delaware
Filed Jan. 3, 1963, Ser. No. 249,294
16 Claims. (Cl. 91—391)

This invention relates to a fluid pressure motor mechanism and has particular reference to such a mechanism especially adapted as power means for operating the brakes of a motor vehicle.

This application is a continuation-in-part of my co-pending application, Serial No. 221,851, filed September 6, 1962.

In my co-pending application referred to there is disclosed a novel type of power brake mechanism for motor vehicles wherein all the work in applying the brakes is performed by the fluid pressure motor. Such application discloses and claims primarily a mechanism which is operative upon a failure in pressure in a source for the motor, for lifting the brake pedal to a higher position for the manual operation of the brakes with leverage comparable to that provided in a conventional pedal-operated brake system. The motor of the present application is disclosed but not claimed in the co-pending application referred to.

An important object of the present invention is to provide a fluid pressure motor mechanism for the purpose stated wherein a normally stationary valve mechanism is operable upon slight movement of the brake pedal for energizing the motor to apply the brakes without a follow-up action of the brake pedal relative to the valve mechanism of the motor under normal conditions, and wherein, upon a failure of pressure in the source, pedal forces may be transmitted axially to the motor piston to apply the brakes.

A further object is to provide a motor mechanism of this type wherein force from the brake pedal, when the source of pressure fails or drops below a predetermined point, is transmitted through an axially movable structure which carries the valve mechanism, the axially movable structure being biased by source pressure to remain stationary in a normal position and being released, when the source pressure fails, to transmit movement to the motor piston for the pedal-operation of the brakes.

A further object is to provide such a mechanism wherein the axially movable structure forms one chamber of the motor and is subjected at both sides to pressure in the source, the structure being so designed that under normal conditions a net pressure acts against the axial structure to tend to maintain it in a normal position in which it remains during operation of the valve mechanism for energizing the motor, and wherein the net effective pressure tending to maintain the axially movable structure in normal position decreases upon a failure of pressure in the source or a drop in such pressure below a predetermined point, so that the axially movable structure then becomes relatively freely movable by the brake pedal to effect movement of the motor piston and hence of the master cylinder piston.

A further object is to provide, in combination with the elements referred to, a novel pedal reaction means which functions not only to transmit a reaction "feel" to the brake pedal, but also to increase the effective net pressure tending to hold the axially movable structure in normal position when pressure in source is above a predetermined point.

A further object is to provide in the combination a valve mechanism the parts of which are pressure balanced so that negligible resistance is offered under normal conditions to the operation of the brake pedal until the reaction means comes into operation.

Other objects and advantages of the invention will become apparent during the course of the following description.

In the drawing I show one embodiment of the invention. In this showing:

FIGURE 1 is an axial sectional view through the motor mechanism and a portion of the master cylinder, the piston of which is operated by the motor mechanism; and FIGURE 2 is a diagrammatic sectional view illustrating in the relation of the pressure areas of certain parts of the motors.

Referring to the drawing, the numeral 10 designates the motor as a whole comprising a cylinder 11, having a preferably integral head 12 at one end thereof bolted as at 13 to a conventional master cylinder indicated as a whole by the number 14. The cylinder 11 is flanged at its other end as at 16 and bolted as at 17 to a housing 18 having a preferably integral closure head 19 at the end remote from the motor.

The motor 10 is shown as having a pressure responsive unit, in the present instance a piston 22, biased to off position by a spring 23. The piston 22 is provided with an axial extension 24 slidable in combined bearing and sealing means 25 carried by the head 12. In any suitable manner, for example as indicated by the number 26, the extension 24 has mechanical connection with the plunger 27 of the master cylinder, which plunger is movable to displace fluid under pressure from a chamber 28 at the end of the master cylinder bore 29 opposite the motor. The master cylinder includes the usual reservoir 32 and openings 33 and 34 communicating with the bore 29, the opening or port 34 being the usual replenishing port.

The numeral 38 designates a normal stationary axially movable structure as a whole having a generally cylindrical outer body one end of which is flanged as at 39 and provided with a seal 40 slidable in the cylinder. The other end of the structure 38 is slidable in the housing 18 and sealed with respect thereto as at 41.

The structure 38 includes a wall 43, which together with the cylindrical portion of the structure 38 and the piston 22 defines a pressure chamber 44 in constant connection with the source of pressure, preferably super-atmospheric pressure as described below. The opposite side of the piston 22 forms with the cylinder 11 and head 12 a variable pressure chamber 45.

The structure 38 is provided with an integral hub portion 48 in which is threaded a nut 49 slidably supporting a valve body 50 carrying resilient valves 51 and 52 at opposite ends thereof, the valve 51 being normally closed in engagement with the adjacent end 53 of the nut 49, serving as a valve seat.

The valve body 50 is provided with an axial passage 58 therethrough the right hand end of which communicates around the normally open valve 52 with a chamber 59 formed in the structure 38. The latter structure is cut away as at 60 to connect the chamber 59 with the motor chamber 44. The wall 43 is provided with a port 61 connecting the chamber 44 to a chamber 62 formed between the wall 43 and head 19. The chamber 62 in turn communicates with an inlet 63 connected to a suitable source of super-atmospheric pressure such as a compressor on the motor vehicle.

The valve 51 is arranged in a chamber 66 formed in the hub 48, and with the parts in the normal positions shown, this chamber communicates through passage 58 with the chamber 59.

A tubular member 67 communicates at its right hand end with the chamber 66. Such end of the tubular member is flared as at 68 and sealed as at 69 with respect to the hub 48. A spring 70 biases the valve body 50 to the normal position shown. The extension 24 is provided with a bore 72 in which the tubular member 67 is arranged and the passage 73 of the member 67 communicates around the left hand end thereof with a passage 74 surrounding the member 67. This passage, in turn, communicates with the motor chamber 45 through a port 75. A washer 76 is interposed between the extension 24 and hub 48.

The seating of the valve 51 normally disconnects the chamber 66 from a passage 78 formed in the nut 49 and the passage 78 communicates with an air passage 79 cast in the axially movable structure 38 and communicating with the atmosphere through a port 80. It will be apparent that when the valve 51 is opened, pressure will be exhausted from the motor chamber 45 through the tubular member 67, chamber 66, passage 78, etc.

A cap member 85 is secured to the wall 43 as at 86, and the periphery of a diaphragm 87 is clamped between the cap member 85 and wall 43. The inner periphery of the diaphragm is clamped between a nut 88 and a head 89, the inner face of the latter of which forms a seat for the valve 52, which is normally open as shown. The head 89 is provided with a passage 92 communicating with a chamber 93 to the right of the diaphragm 87. Obviously the chamber 93 normally communicates through the passage 92 with the chamber 59. A spring 95 is arranged in the chamber 93 and engages a ferrule 96 contacting the diaphragm 87 and biasing the latter into engagement with a shoulder 97 formed integral with the wall 43.

The head 89 carries an axial stem 99 slidable in an axial member 100 formed integral with the cap member 85. The right hand end of the stem 99 engages a slidable head 101 connected in any suitable manner, for example at 102, with an operating push rod 103 connected in turn to the brake pedal (not shown) of a motor vehicle.

*Operation*

The parts normally occupy the positions shown in the drawing. The mechanism is designed for operation with a source of super-atmospheric pressure, and such source is connected with the port 63. The chamber 62 accordingly is connected to the source and the chamber 44 is maintained at source pressure through the port 61. Accordingly, source pressure acts against the right side of the piston 22 at all times, except when pressure in the source fails. The chamber 59 communicates with the chamber 44, and since the valve 52 is normally open, pressure in the source will be communicated through the bores 58 and 73 and through the passage 74 and port 75 to the variable pressure motor chamber 45.

Since pressures are normally balanced in the motor chambers 44 and 45, the biasing spring 23 normally maintains the piston 22 in its off position shown. As stated, source pressure exists in the chambers 44 and 62. Since the end of the axially movable structure 38, which is slidable in the cylinder 11, is of greater diameter than the opposite end which is slidable in the housing 18, the structure 38 is subject to a net pressure acting to the right to maintain the structure 38 in its off position shown not only when the mechanism is inoperative, but also during the operation of the motor 10, as will become further apparent below. Source pressure will be present on opposite sides of the diaphragm 87 and this element will be normally subject to balanced pressures and the spring 95 will maintain the diaphragm in engagement with the shoulder 97. The valve mechanism will be substantially pressure balanced so that upon operation, the axial movement of the valve will be resisted solely by the spring 70.

Assuming that the brake pedal (not shown) is operated from its normal position, the rod 103 will be moved to the left to effect similar movement of the stem 99 and the head 89. This head then will engage the valve 52 to close communication between the chambers 59 and 66, thus closing the connection of the motor chamber 45 to the pressure source. Slight further pedal movement will effect movement of the valve body 50 to crack the valve 51, thus opening the chamber 66 to the atmosphere through the port 78 and atmospheric passage 79. Since the chamber 45 is in fixed communication with the chamber 66, there will be an immediate drop in pressure in the chamber 45. The rate and extent of such pressure drop will depend upon the degree of opening of the valve 51.

A drop in pressure in the chamber 45 obviously subjects the piston 22 to differential pressures, and the higher pressure in the chamber 44 will move the piston 22 to the left to move the master cylinder plunger 27 in the same direction to displace fluid from the chamber 28 through the usual hydraulic lines to the vehicle wheel cylinders (not shown).

Thus application of the brakes will begin. Play between the brake shoes and drums will be taken up and the shoes will engage the drums to an extent proportionate to differential pressures acting on the piston 22. It will be noted that the chamber 93 will now communicate, not with the source, but with the chamber 45 through passage 92, bores 58 and 74, etc. Thus pressure in the chamber 93 will drop proportionately to pressure in the chamber 45. Pressure in the chamber 59, therefore, exceeding pressure in the chamber 93, will act on the head 89 to somewhat oppose brake pedal operation. This opposition will be proportionate to the difference in pressures in the chambers 59 and 93. This provides an initial stage of reaction against the brake pedal.

Differential pressures in the chambers 59 and 93 also will act on the diaphragm 87. No movement of this diaphragm, however, will take place during initial brake operation for taking up play between the brake shoes and the brake drums, the spring 95 being sufficiently strong to prevent movement of the diaphragm 87.

Initial movement of the master cylinder plunger 27 takes place relatively easily until the brake shoes engage the drums. At this point in the operation of the mechanism, movement of the master cylinder plunger 27 slows down and corresponding movement of the piston 22 is retarded. The chamber 45 accordingly is reduced in capacity relatively slower and pressure therein will drop more rapidly for a given opening movement of the valve 51. This more rapid drop in pressure in the chamber 45 is immediately communicated to the diaphragm chamber 93, which is now in communication with the chamber 45, as stated. At this point differential pressures in the chambers 59 and 93 will overcome the spring 95 and the ferrule 96 will move to its limit to the right relative to the nut 88. Differential pressures acting to the right against the diaphragm will now be added to pressure acting in the same direction against the head 89, thus providing a second stage of pedal reaction.

As previously stated, there is normally a net pressure acting to the right against the axially movable structure 38. This biasing pressure is decreased during brake operation. Whereas under normal conditions, oppositely acting pressures in the chambers 59 and 93 are equal, a different condition exists during brake operation. Except in the case of maximum brake application to the extent of a power "run-out" of the motor, that is, when the motor is energized to its maximum extent with atmospheric pressure in the chamber 45, there will be pressure present in the chamber 93. This pressure depends upon the extent of motor energization and acts with equal force to the right and left. However, the force acting on the reaction elements described will be absorbed by the foot of the operator on the pedal, and pressure will act toward the right in the chamber 93. This pressure now acts against the left-facing surfaces of the chamber 93 to add to the net pressure tending to hold the axially movable structure 38 against movement to the left. Thus pedal operation will effect energization of the motor to any extent from zero up to almost maximum brake application with a net pressure force acting to the right against the structure 38. Accordingly it is necessary for the pedal and the parts mechanically connected thereto to move only a slight fraction of an inch, such movement being required only to close the valve 52 and crack the valve 51. With reaction on the brake pedal, the operator is apprised of the degree of brake application. The operator, therefore, when brake application is sufficient, may very slightly back off on the pedal to close the valve 51 and establish lap positions of the valves 51 and 52 to maintain as long as desired the previously established motor energization and brake application.

By way of amplification of the foregoing, attention is invited to FIGURE 2 of the drawings. The parts are illustrated structurally different from FIGURE 1 for a clear understanding of the relationship of the various pressure areas, and the parts, passages and chambers in FIGURE 2 have been indicated by the same numerals as the related parts in FIGURE 1. The amount of the biasing force tending to hold the structure 38 in normal inoperative position is dependent upon diameter D, namely, the diameter of the smaller end of the structure 38. Basic design considerations dictate diameters A and C, namely the diameters of the larger end of the structure 38 and the diameter of the diaphragm 87. Diameter D is then determined using the following formula:

Area dia. $D$=dia. $A$—area dia. $B$+area dia. $C$

The formula can also be written in the following two forms:

(a) Area dia. $B$=area dia. $A$—area dia. $D$+area dia. $C$
(b) Area dia. $B$—area dia. $C$=area dia. $A$—area dia. $D$ The net area subject to differential pressure accordingly is equal to the area of the reaction device or diaphragm 87 (area of diameter B) and this biasing effect acts to the left against the structure 38 when the parts are in normal positions. During brake operation, the control air pressure in chamber 93 is a lower pressure than the supply pressure and this pressure is zero or atmospheric pressure at power "run-out," that is, when the motor is fully energized. In other words, the full biasing pressure under normal inoperative conditions gradually decreases as the motor is progressively energized until it reaches zero at power "run-out." As the motor is progressively energized and pressure in the chamber 93 is reduced, there is a biasing effect on the right-hand end of the structure 38 acting to the left. There is also a biasing effect on the reaction diaphragm to the right which is resisted by the operator. At power "run-out," when the chamber 93 is at atmospheric pressure, the biasing effect to the left against the structure 38 by pressure in the chamber 62 is equal to the biasing effect due to the difference in the two diameters A and D (see Formula b). Therefore, the structure 38 is in pressure balance, and for the operator to "push through" to pick up the piston 22 requires no additional pressure other than that which he is already exerting to overcome the differential pressure on the reaction piston.

In summary, the structure 38 is biased to the right when the unit is off. This biasing effect decreases during a brake application as the operator increases his pedal force, or as the pressure differential on the reaction diaphragm increases. At power "run-out", the biasing effect on the structure 38, is zero and the pressure differential on the reaction piston is at a maximum. Any further increase in pedal force by the operator will cause the reaction diaphragm to mechanically pick up the structure 38 and move it to the left to operate the piston 22 to allow the operator to further build up pressure in the master cylinder by direct mechanical operation.

When the brake pedal is released, force is released from the head 89 and pressure in the chamber 59 will move the head 89 to the right. The spring 70 will return the valve body 50 to normal position, such movement being arrested by engagement of the valve 51 with the valve seat 53. The valve 52 will remain in the open position shown. Accordingly, the motor chamber 45 will be disconnected from the atmosphere and again connected through bore 58 with the pressure chamber 59 to balance pressures in the motor chambers 44 and 45. The spring 23 will return the piston 22 to normal position, and the opening of the valve 52 reestablishes source pressure in the chamber 93 through chamber 59 and passage 92.

The present mechanism may be used with a so-called pedal "pop-up" mechanism which functions, as in the co-pending application referred to, to lift the pedal to a higher position for the manual operation of the brakes if pressure in the source fails or drops below a predetermined point. However, the unit works equally well with a fixed pivot brake pedal which "pushes through" under conditions of no supply air pressure or above power "run-out". The present mechanism is highly advantageous in that it provides a motor which performs all of the work for its intended purpose, for example, applying the brakes of a motor vehicle, and wherein the valve control member, such as a brake pedal, need move only to a slight extent with source pressure preventing movement of those parts of the mechanism which carry the valve elements. It is preferred that the pedal "pop-up" mechanism function where a super-atmospheric pressure source is employed, when pressure in said source not only fails completely, but also drops to a point where the motor cannot develop a pressure in the master cylinder chamber of at least 400 p.s.i. Under such conditions the pedal will be moved to a different and higher normal position from which it provides leverage comparable to conventional brake systems to facilitate pedal operation of the brakes. Such a mechanism is described and claimed in the co-pending application of Lawrence A. Pulkownik and David T. Ayers, Jr., Serial No. 234,744, filed November 1, 1962.

It is well known that in so-called booster brake mechanisms the pedal travel and leverage is so limited as to require great force for pedal operation of the brakes if the power fails. In a full power-brake mechanism such as the present one, the brake pedal may occupy an even lower normal position, thus making it substantially impossible to pedal-operate the brakes. With either type of mechanism it is desired to increase the pedal leverage for pedal operation of the brakes. With the present mechanism, pedal forces are adapted to be transmitted through elements 103, 101, 99, 89, 49, washer 76, and piston 22 to pedal operate the brakes. In the event of a complete failure in power, atmospheric pressure will exist in all chambers of the mechanism and there will be no biasing force tending to hold the axially movable structure 38 against movement. Thus the axially in-line movement referred to may be transmitted to the piston 22 to operate the brakes.

Even if there is not a complete failure of pressure in the source, it will be apparent that when such pressure caused, for example, by leakage, drops below the predetermined point referred to, a pressure biasing force acting to the right on the structure 38 and associated elements will decrease to the point where the higher leverage provided in a brake pedal of the "pop-up" type referred to permits pedal operation in the manner described to effect movement of the master cylinder plunger 27.

Attention is also invited to the fact that in mechanisms employing an axially movable structure of the nature of the structure 38 together with two motor casings such as the cylinder 11 and housing 18, it is necessary to seal the joint therebetween. In the present case, however, the chambers 44 and 62 are sealed from the joint between the two casing sections as at 40 and 41, and the space between these seals communicates with the atmosphere in any event through the port 80. Accordingly no joint sealing means is required.

It is to be understood that the form of the invention shown and described is to be taken as a preferred example of the same and that various changes in the shape, size and arrangements of parts may be made as do not depart from the spirit of the invention or the scope of the appended claims.

I claim:

1. A fluid pressure motor mechanism comprising a motor having a housing and a pressure responsive unit therein provided at one side with a first chamber, an axially movable structure in said housing in the end thereof opposite said first chamber and forming with said pressure responsive unit a second chamber, said structure forming with the end of said housing opposite said pressure responsive unit a third chamber communicating with said second chamber to balance pressures therein, a pressure source, a manually operable mechanism, a valve mechanism normally balancing pressures in said first and second chambers and being movable to unbalance pressures in such chambers to move said pressure responsive unit, said pressure source communicating with said third chamber, said structure having a larger area communicating with said second chamber than with said third chamber to provide a net pressure tending to hold said structure in a normal position, and means for transmitting forces from said manually operable mechanism to said pressure responsive unit to move the latter upon a drop in pressure in said source below a predetermined point.

2. A fluid pressure motor mechanism comprising a motor having a housing and a pressure responsive unit therein provided at one side with a first chamber, an axially movable structure in said housing in the end thereof opposite said first chamber and forming with said pressure responsive unit a second chamber, said structure forming with the end of said housing opposite said pressure responsive unit a third chamber communicating with said second chamber to balance pressures therein, a pressure source, a manually operable mechanism, a valve mechanism normally balancing pressures in said first and second chambers and being movable to unbalance pressures in such chambers to move said pressure responsive unit, said pressure source communicating with said third chamber, said structure having an end adjacent said pressure responsive unit slidable in said housing and an opposite end of smaller diameter than said first named end slidable in said housing whereby said structure has a larger area communicating with said second chamber than with said third chamber to providet a net pressure tending to hold said structure in a normal position and means for transmitting forces from said manually operable mechanism to said pressure responsive unit to move the latter upon a drop in pressure in said source below a predetermined point.

3. A fluid pressure motor mechanism comprising a motor having a housing and a pressure responsive unit therein provided at one side with a first chamber, an axially movable structure in said housing in the end thereof opposite said first chamber and forming with said pressure responsive unit a second chamber, said structure forming with the end of said housing opposite said pressure responsive unit a third chamber communicating with said second chamber to balance pressures therein, a pressure source, a manually operable mechanism, a valve mechanism normally balancing pressures in said first and second chambers and being movable to unbalance pressures in such chambers to move said pressure responsive unit, said pressure source communicating with said third chamber, said structure having a larger area communicating with said second chamber than with said third chamber to provide a net pressure tending to hold said structure in a normal position, means for increasing said net pressure when said valve mechanism is operated for unbalancing pressures in said first and second chambers, and means for transmitting forces from said manually operable mechanism to said pressure responsive unit to move the latter upon a drop in pressure in said source below a predetermined point.

4. A fluid pressure motor mechanism comprising a motor having a housing and a pressure responsive unit therein provided at one side with a first chamber, an axially movable structure in said housing in the end thereof opposite said first chamber and forming with said pressure responsive unit a second chamber, said structure forming with the end of said housing opposite said pressure responsive unit a third chamber communicating with said second chamber to balance pressures therein, a pressure source, a manually operable mechanism, a valve mechanism normally balancing pressures in said first and second chambers and being movable to unbalance pressures in such chambers to move said pressure responsive unit, said pressure source communicating with said third chamber, said structure having an end adjacent said pressure responsive unit slidable in said housing and an opposite end of smaller diameter than said first named end slidable in said housing whereby said structure has a larger area communicating with said second chamber than with said third chamber to provide a net pressure tending to hold said structure in a normal position, means for increasing said net pressure when said valve mechanism is operated for unbalancing pressures in said first and second chambers, and means for transmitting forces from said manually operable mechanism to said pressure responsive unit to move the latter upon a drop in pressure in said source below a predetermined point.

5. A fluid pressure motor mechanism comprising a motor having a housing and a pressure responsive unit therein provided at one side with a first chamber, an axially movable structure in said housing in the end thereof opposite said first chamber and forming with said pressure responsive unit a second chamber, said structure forming with the end of said housing opposite said pressure responsive unit a third chamber communicating with said second chamber to balance pressures therein, a pressure source, a manually operable mechanism, a valve mechanism normally balancing pressures in said first and second chambers and being movable to unbalance pressures in such chambers to move said pressure responsive unit, reaction means subject to differential pressures in said first and second chambers for opposing movement of said manually operable mechanism to a degree proportional to said differential pressures, said pressure source communicating with said third chamber, said structure having a larger area communicating with said second chamber than with said third chamber to provide a net pressure tending to hold said structure in a normal position, and means for transmitting forces from said manually operable mechanism to said pressure responsive unit to move the latter upon a drop in pressure in said source below a predetermined point.

6. A motor mechanism according to claim 5 provided with means for utilizing the force of said reaction means for increasing said net biasing pressure tending to hold said structure in said normal position.

7. A fluid pressure motor mechanism comprising a motor having a housing and a pressure responsive unit therein provided at one side with a first chamber, an axially movable structure in said housing in the end thereof opposite said first chamber and forming with said pressure responsive unit a second chamber, said structure forming with the end of said housing opposite said pressure responsive unit a third chamber communicating with said second chamber to balance pressures therein, a pressure source, a manually operable mechanism, a valve mechanism normally balancing pressures in said first and second chambers and being movable to unbalance pressures in such chambers to move said pressure responsive unit, reaction means subject to differential pressures in said first and second chambers for opposing movement of said manually operable mechanism to a degree proportional to said differential pressures, said pressure source communicating with said third chamber, said structure having an end adjacent said pressure responsive unit slidable in said housing and an opposite end of smaller diameter than said first named and slidable in said housing whereby said structure has a larger area communicating with said second chamber than with said third chamber to provide a net pressure tending to hold said structure in a normal position and means for transmitting forces from said manually operable mechanism to said pressure responsive unit to move the latter upon a drop in pressure in said source below a predetermined point.

8. A motor mechanism according to claim 7 provided with means for utilizing the force of said reaction means for increasing the net pressure tending to hold said structure in said normal position.

9. A fluid pressure motor mechanism comprising a motor having a housing and a pressure responsive unit therein provided at one side thereof with a first chamber in one end of said housing, an axially movable structure in said housing in the end thereof opposite said first chamber and forming with said pressure responsive unit a second chamber, said one end of said housing being cylindrical and the adjacent end of said structure being slidable therein in sealed relation therewith, the other end of said housing being of smaller diameter and said structure having its other end slidable therein in sealed engagement therewith, said structure forming with said other end of said housing a tihrd chamber communicating with said second chamber to balance pressures therein, a pressure source, a manually operable mechanism projected into said other end of said housing, a valve mechanism carried partly by said structure and partly by said manually operable mechanism, said pressure source communicating with said third chamber, said valve mechanism normally balancing pressures in said first and second chambers and being movable to lower pressures in said first chamber to move said pressure responsive unit, the larger diameter of the first named end of said structure relative to said other end thereof providing said structure with a larger area exposed to pressure in said second chamber than in said third chamber to provide a net pressure biasing said structure to a normal position toward said other end of said housing, and means for transmitting forces from said manually operable mechanism to said pressure responsive unit to move the latter upon a drop in pressure in said source below a predetermined point.

10. A motor mechanism according to claim 9 provided with means for increasing said net pressure when said valve mechanism is operated to lower pressures in said first chamber.

11. A motor mechanism according to claim 9 provided with means for reacting against said manually operable member with a force proportional to differential pressures in said first and second chambers.

12. A motor mechanism according to claim 9 provided with means for reacting against said manually operable member with a force proportional to differential pressures in said first and second chambers, such means comprising a pressure responsive element connected to said manually operable mechanism and subject to pressure in said second chamber, which pressure is absorbed by said manually operable mechanism, pressure at the opposite side of said pressure responsive element acting in the same direction as said net pressure to increase the force of the latter for tending to hold said structure in said normal position.

13. A fluid pressure motor mechanism comprising a motor having a housing and a pressure responsive unit therein, said unit at one end of said housing forming therewith a first chamber, an axially movable structure in said housing within the other end thereof and forming with said pressure responsive unit a second chamber, said structure forming with the extremity at said other end of said housing a third chamber communicating with said second chamber to balance pressures therein, the ends of said structure being slidable in said housing and having pressure seals engaging therewith, the space between said seals being open to the atmosphere, a pressure source communicating with one of said second and third chambers, a manually operable mechanism, a valve mechanism normally connecting said second chamber to said first chamber and operable for disconnecting said chambers and opening said first chamber to the space between said seals, said structure having a larger area communicating with said second chamber than with said third chamber to provide a net pressure tending to hold said structure in a normal position, and means for transmitting forces from said manually operable mechanism to said pressure responsive unit to move the latter upon a drop in pressure in said source below a predetermined point.

14. A motor mechanism according to claim 13 provided with means for increasing said net pressure when said valve mechanism is operated to release pressure from said first chamber.

15. A motor mechanism according to claim 13 provided with reaction means subject to differential pressures in said first and second chambers for opposing movement of said manually operable mechanism to a degree proportional to such differential pressures.

16. A motor mechanism according to claim 13 provided with reaction means subject to differential pressures in said first and second chambers for opposing movement of said manually operable mechanism to a degree proportional to such differential pressures, said reaction means comprising a pressure responsive element connected to said manually operable mechanism, one side of said pressure responsive element being exposed to said second chamber, said structure having a reaction chamber therein to which the other side of said pressure responsive element is exposed, said reaction chamber having a wall against which pressure in such chamber act to add to said net pressure when pressure in said second chamber acting against said pressure responsive element is absorbed by said manually operable mechanism.

References Cited in the file of this patent
UNITED STATES PATENTS

| | | |
|---|---|---|
| 3,051,530 | Ayers | Aug. 28, 1962 |
| 3,067,727 | Ayers et al. | Dec. 11, 1962 |
| 3,075,499 | Prather | Jan. 29, 1963 |
| 3,076,441 | Ayers | Feb. 5, 1963 |
| 3,078,677 | Cripe | Feb. 26, 1963 |
| 3,083,698 | Price et al. | Apr. 12, 1963 |